(12) United States Patent
Armitage et al.

(10) Patent No.: US 9,317,502 B2
(45) Date of Patent: Apr. 19, 2016

(54) SYSTEM AND METHOD FOR MONITORING ITEMS

(71) Applicant: Cartasite, Inc., Denver, CO (US)

(72) Inventors: David Armitage, Golden, CO (US); Mark Mason, Thornton, CO (US)

(73) Assignee: Cartasite, Inc., Denver, CO (US)

( * ) Notice: Subject to any disclaimer, the term of this patent is extended or adjusted under 35 U.S.C. 154(b) by 82 days.

(21) Appl. No.: 14/044,014

(22) Filed: Oct. 2, 2013

(65) Prior Publication Data

US 2014/0091141 A1  Apr. 3, 2014

Related U.S. Application Data

(60) Provisional application No. 61/708,954, filed on Oct. 2, 2012.

(51) Int. Cl.
*G06Q 90/00* (2006.01)
*G06F 17/30* (2006.01)
*G06K 7/14* (2006.01)
*G06K 19/06* (2006.01)

(52) U.S. Cl.
CPC .............. *G06F 17/30* (2013.01); *G06K 7/1413* (2013.01); *G06K 7/1417* (2013.01); *G06K 19/06028* (2013.01); *G06K 19/06037* (2013.01)

(58) Field of Classification Search
CPC .............. G06Q 10/087; G06Q 20/203; G06K 2017/0045
USPC ........................................................ 235/385
See application file for complete search history.

(56) References Cited

U.S. PATENT DOCUMENTS 5,953,682 A * 9/1999 McCarrick et al. ............. 702/45
2014/0224870 A1 * 8/2014 Schoening et al. ........... 235/376

* cited by examiner

*Primary Examiner* — Jamara Franklin
(74) *Attorney, Agent, or Firm* — Thomas A. Dougherty

(57) ABSTRACT

Systems, software, and methods for improved monitoring and identification systems for items and units to be serviced and reported, such as seal tags and other information from items or units to be serviced.

20 Claims, 7 Drawing Sheets

SYSTEM AND METHOD FOR MONITORING ITEMS

CROSS REFERENCE TO RELATED APPLICATIONS

This application claims priority to, and benefit from, provisional patent application Ser. No. 61/708,954, entitled "SYSTEM AND METHOD FOR MONITORING WORK ITEMS", filed Oct. 2, 2012, which is incorporated by reference for all purposes.

TECHNICAL BACKGROUND

Seal tags are used to ensure that oil or other products are not improperly accessed between services of a dispensing unit. Once a product has been dispensed from the dispensing unit, a seal tag is placed on the dispensing unit such that product cannot further be dispensed with the seal tag in place. In some examples, such as oil dispensing, a number is added such that the number should match between authorized service appearances at the dispensing object. Often, these numbers are recorded each time a dispensing unit is accessed and later monitored to determine if any discrepancies exist between the authorized visits.

In addition to monitoring oil distribution units, oil companies may also choose to monitor the equipment that services the distribution units. This monitoring typically includes drivers or operators recording, in paper form, the condition of the equipment. Such recording could include the oil level, the tire pressure, the gas level, or any other information about the equipment.

Barcodes and Quick Response Codes (QR Codes) are used to identify objects or provide other information about an object. A barcode is an optical machine-readable representation of data relating to an object. These codes are one-dimensional and are capable of being read by specially made scanners, phones, or any other device optically capable of scanning barcodes. In comparison, QR Codes are two-dimensional codes that are capable of storing a greater amount of data than Barcodes. QR Codes may be scanned using special scanners, phones, or other devices configured to read the encoded data.

OVERVIEW

Systems and methods are provided for improved monitoring and identification systems for items and units to be serviced and reported.

DESCRIPTION

Systems and methods are provided for improved monitoring systems. In at least one example, the system includes tagged oil distribution units. These oil distribution units may contain both an identifier code, which identifies the particular distribution unit, as well as a seal tag, which is used to prevent improper access to the oil distribution unit. When a user arrives at the distribution unit, the user may record information such as the identifier code of the distribution unit, the current seal tag, the new seal tag, as well as any other information about the oil transaction using an electronic user device. Once the information is recorded, the data may then be transmitted to a central system that maintains information regarding all distribution units.

In an alternative example, the system includes tagged equipment that needs to be monitored. This equipment could include trucks, machinery, or any other equipment that requires maintenance checks. In operation, a user device may be used to record data about the maintenance of the equipment such as information about fluid, such as the fuel level, oil level, amount extracted from the ground or tank, or any other useful fluid or maintenance information. Once the data is recorded, the data may then be transmitted to a central system that maintains information regarding all the equipment.

Figure 1:
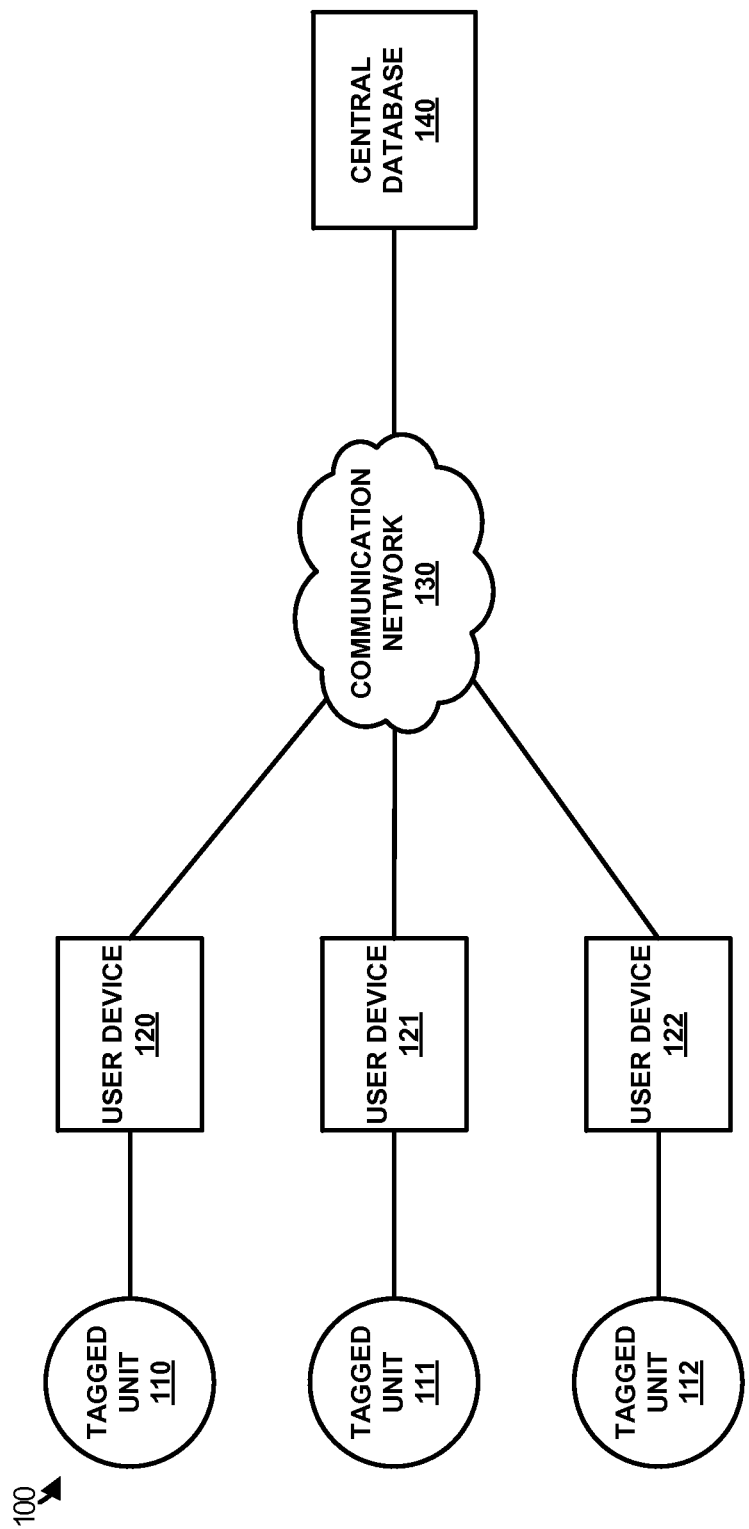
FIG. 1 illustrates a monitoring system according to one example.

FIG. 1 illustrates a monitoring system 100 according to one example. System 100 includes tagged units 110-112, user devices 120-122, communication network 130, and central database 140.

In FIG. 1, user devices 120-122 record information about tagged units 110-112 then transmit this information to central database 140 through communication network 130. User devices 120-122 may use this information in a trip or report to identify aspects of the units 110-112. The report may then be transmitted through communication network 130 to central database 140 or to other destinations.

In one example, tagged units 110-112 can include any object that uses a seal tag and is capable of distributing oil or other products. In another example, tagged units 110-112 can include trucks, cars, or any other mechanical equipment.

User devices 120-122 can include any objects capable of collecting information about tagged units 110-112. Devices 120-122 can include smart phones, tablets, or any other portable device capable of collecting information. The information collected may include an identifier for the tagged unit such as a QR Code, a seal tag identifier such as a barcodes or numbers, the amount of oil or other product being transferred, the oil level of the equipment, as well as any other information about tagged units 110-112.

Communication network 130 can include the Internet, Wi-Fi, cellular, satellite, or any other form of communication network, or combinations thereof, capable of facilitating communication between user devices 120-122 and central database 140.

Central database 140 can include one or more server computers, desktop computers, or any other devices configured to store and track information received from user devices 120-122.

Figure 2:
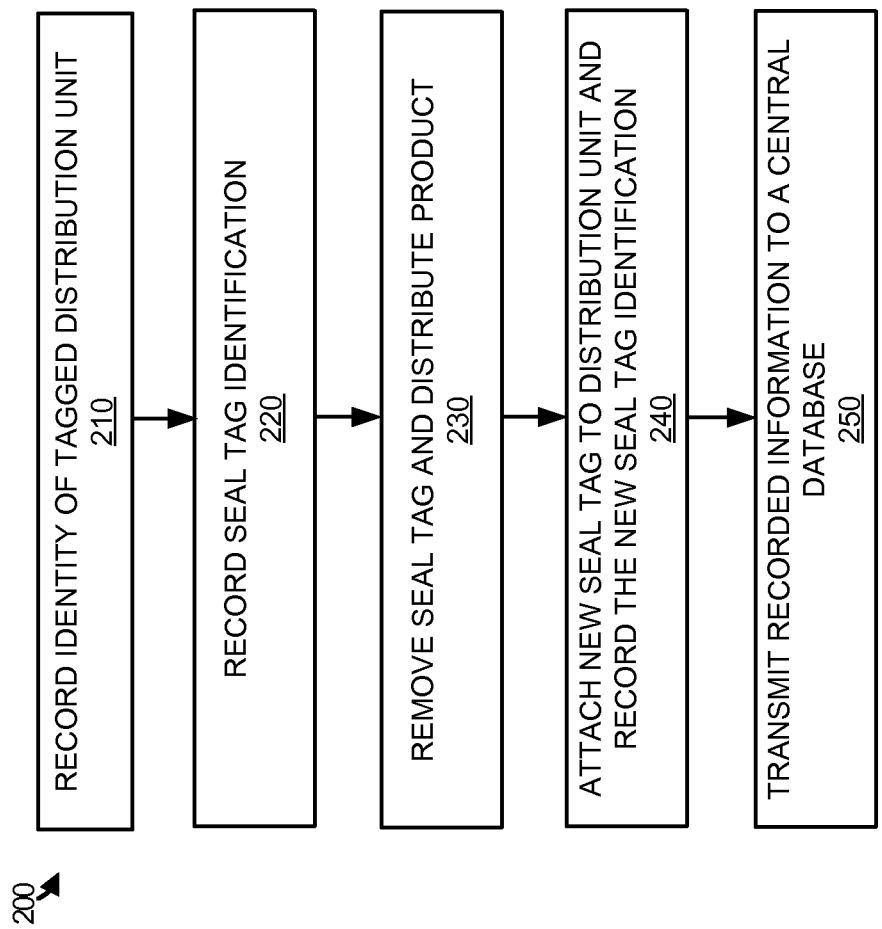
FIG. 2 illustrates a monitoring method according to one example.

FIG. 2 illustrates a monitoring method 200 for monitoring oil distribution units. The method begins with the user starting a recording application on a user device and recording the identity of a tagged distribution unit (step 210). This user device may include a smart phone, tablet computer, or any other wireless device capable of collecting information from the tagged distribution unit. Additionally, the identity of the tagged distribution unit may be determined from a QR code, Barcode, written title, or any other method of identifying the unit. In one example, the tagged distribution unit can include a QR code such that the user may take a picture of the code to determine the identity of the unit.

Once the tagged distribution unit has been identified, the user may then record the current seal tag (step 220). In one example, this tag can include numbers and a Barcode or QR code such that the user can scan the barcode/QR code to identify the seal tag. In other examples, the user may enter the number on the tag or take a picture of the numbers on the tag.

Next, the user may remove the current seal tag and distribute the oil as needed (step 230). Thereafter, a new seal tag may be placed on the distribution unit and the seal tag identity may be recorded in the same manner as described above (step 240).

In one example, other information may be recorded by the user such as the amount of oil transferred, pictures of the surrounding area, amount of time at the location, or any other information regarding the distribution unit. Further, the user device could record times and global positioning locations for the transactions.

Finally, the collected information is transferred to a central database to store and track the information from all of the distribution units (step 250). The collected information may be used to populate fields of a dynamic form, which may be used for the trip or servicing of the unit. This form may be sent to central database or in an email to the supervisor and/or customer. This form may also be used for billing, invoicing, and/or for information about the services performed at the site/unit.

In one example, the information gathered from the distribution unit could be transmitted after all the information is gathered. In situations where the communication network is unavailable, the information can be sent when the network becomes available. In another example, the information could be transmitted immediately as the information is gathered. In situations where the communication network is unavailable, the information can be sent when the network becomes available. In another example, the collected information could be sent periodically to the central database over the communication network. In another example, the collected information could be requested by the central database.

Although the example transaction method is an oil transaction method, it should be understood that the method could apply to any situation that uses seal tags to monitor transactions. Additionally, it should be understood that the order of events in method 200 could be rearranged or accomplished concurrently.

With this system and method, information collected may be more accurate than if entered by a user. Furthermore, the information may be more reliable as the time and GPS information is recorded, insuring the user was at the particular unit when the information was retrieved and/or entered.

Figure 3:
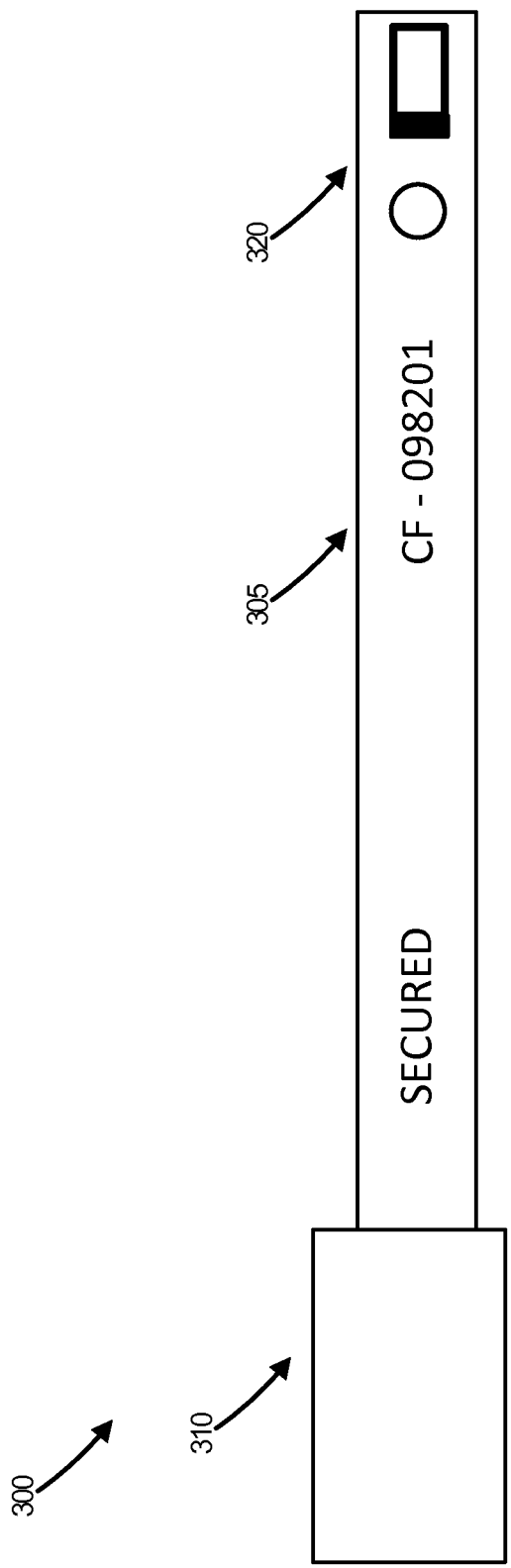
FIG. 3 illustrates a prior art oil seal tag.

FIG. 3 illustrates a prior art oil seal tag 300. As can be viewed in the illustration, the seal tag only includes a number 305 identifying the seal tag. The seal tag may have bonding structures 310 and 320 configured to couple the ends of the seal tag together.

A user would have to manually write or enter the information for this seal tag on to paper or into a form. Mistakes could be made when doing this or when entering the information into a central database. Furthermore the user would have to manually write or enter information about the unit as well. This may further create mistakes in information.

Figure 4:
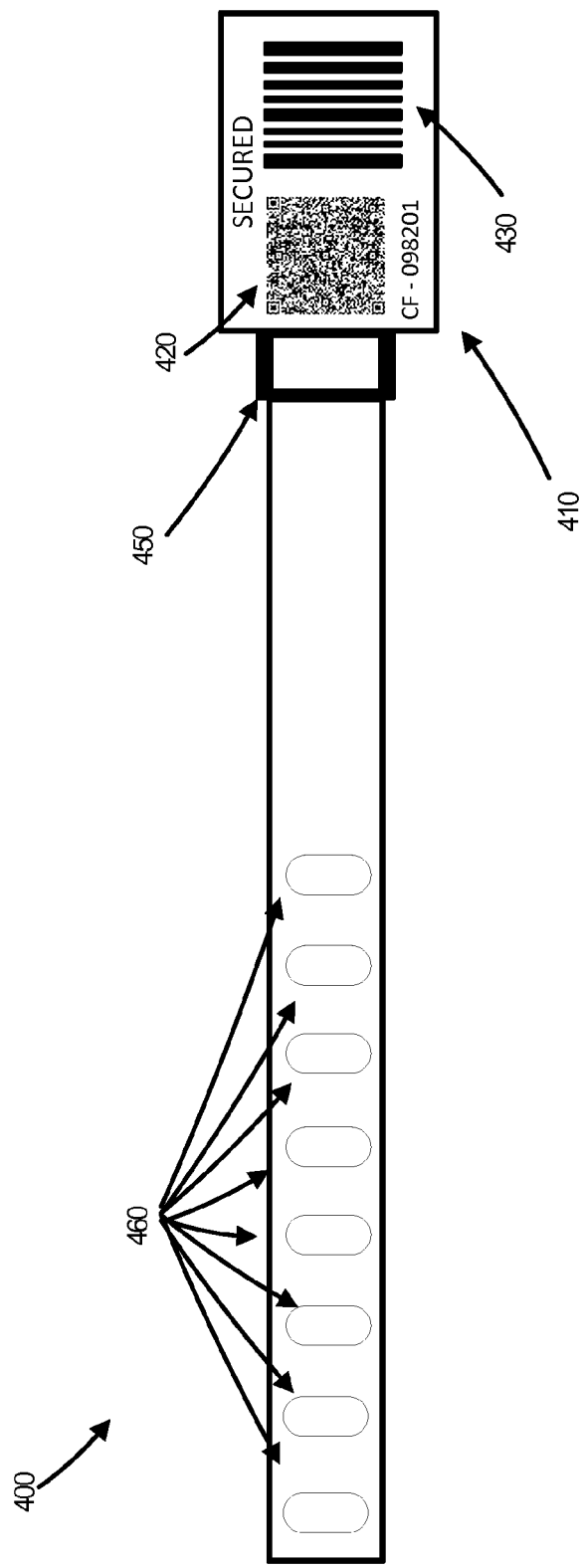
FIG. 4 illustrates an oil seal tag according to one example.

FIG. 4 illustrates a seal tag 400 according to one example. As can be viewed in the illustration, the seal tag includes a number 410 identifying the seal tag, a QR code 420, and/or a bar code to identify 430 the seal tag 400. The seal tag may include one or more of the identification information, or other methods or systems for identifying the seal tag.

Seal tag 400 may also include a locking portion 450 and corresponding locking structures 460. The end of seal tag 400 with the locking structures may extend through locking portion 450 to secure the end of tag 400 within the locking portion 450.

Figure 5:
FIG. 5 illustrates an example QR Code.

FIG. 5 illustrates an example QR Code 500 that can be used for identifying the tagged distribution unit. QR code 500 may include information about the well site, well, pump, tank, and/or other information about the unit, and/or combinations thereof.

QR code may also be an example of a QR code on the seal tag 400. It may identify the tag, user, and/or other information.

Figure 6B:
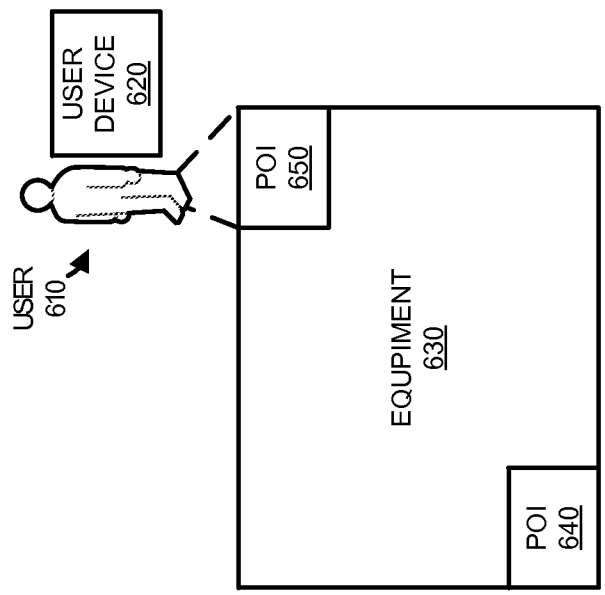
FIG. 6B illustrates an operation of a monitoring system according to one example.
Figure 6A:
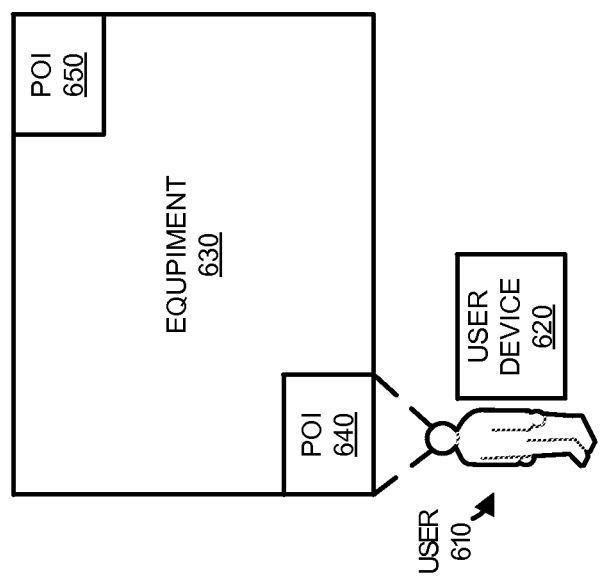
FIG. 6A illustrates an operation of a monitoring system according to one example.

FIGS. 6A and 6B illustrate an alternative operation of the monitoring system. In FIGS. 6A and 6B, rather than recording information about an oil distribution unit, the user device is configured to record the status of mechanical equipment including the oil level of the equipment, the pressure of the equipment, or any other information about the equipment. The equipment could include trucks, machinery, or any other equipment used to perform a task. FIGS. 6A and 6B include user 610, user device 620, equipment 630, and points of interest 640-650 (POI).

In operation, user 610 will initiate a recording application on user device 620. This recording application can allow user 610 to record information about equipment 630 including an identifier of equipment 630 and information about points of interest 640-650. Points of interest 640-650 can include the engine, the tires, or any other point of interest on the equipment.

As can be seen in FIG. 6A, user 610 records information about point of interest 640. This information may include a Barcode, a QR code, a name, a number, or any other identifier of point of interest 640. Further, the application on user device 620 may allow user 610 to input information such as the oil level, the tire pressure, or any other information about point of interest 640. The application may also allow user 610 to take pictures of equipment 630 and point of interest 640. User device 620 may also record the GPS information and the time, movement from an accelerometer, and other information.

Next, after recording information about point of interest 640, user 610 may then proceed to record information about point of interest 650 (FIG. 6B). This information may include a Barcode, a QR code, a name, a number, or any other identifier of point of interest 650. Further, the application on user device 620 may allow user 610 to input information such as the oil level, the tire pressure, or any other information about point of interest 650. The application may also allow user 610 to take pictures of equipment 630 and point of interest 650. User device 620 may also record the GPS information and the time, movement from an accelerometer, and other information.

It should be understood that although FIGS. 6A and 6B include two points of interest, any number of points of interest could be recorded by the system.

In one example, user device 620 could gather other information such as the identity of the user device, the global positioning location of the user device, the amount of time to record the information about all of the points of interest, the amount movement by the user in recording the information about the points of interest, or any other information about equipment 630.

Once information is gathered by user device 620, user device 620 may then populate reports with the information, and transfer the information to a central database using a communication network such as the Internet, cellular network, satellite network, or any other network or system capable of being used to transmit information. The central database may then store all of the data about equipment 630, as well as any other data about equipment sent from similar user devices.

Figure 7:
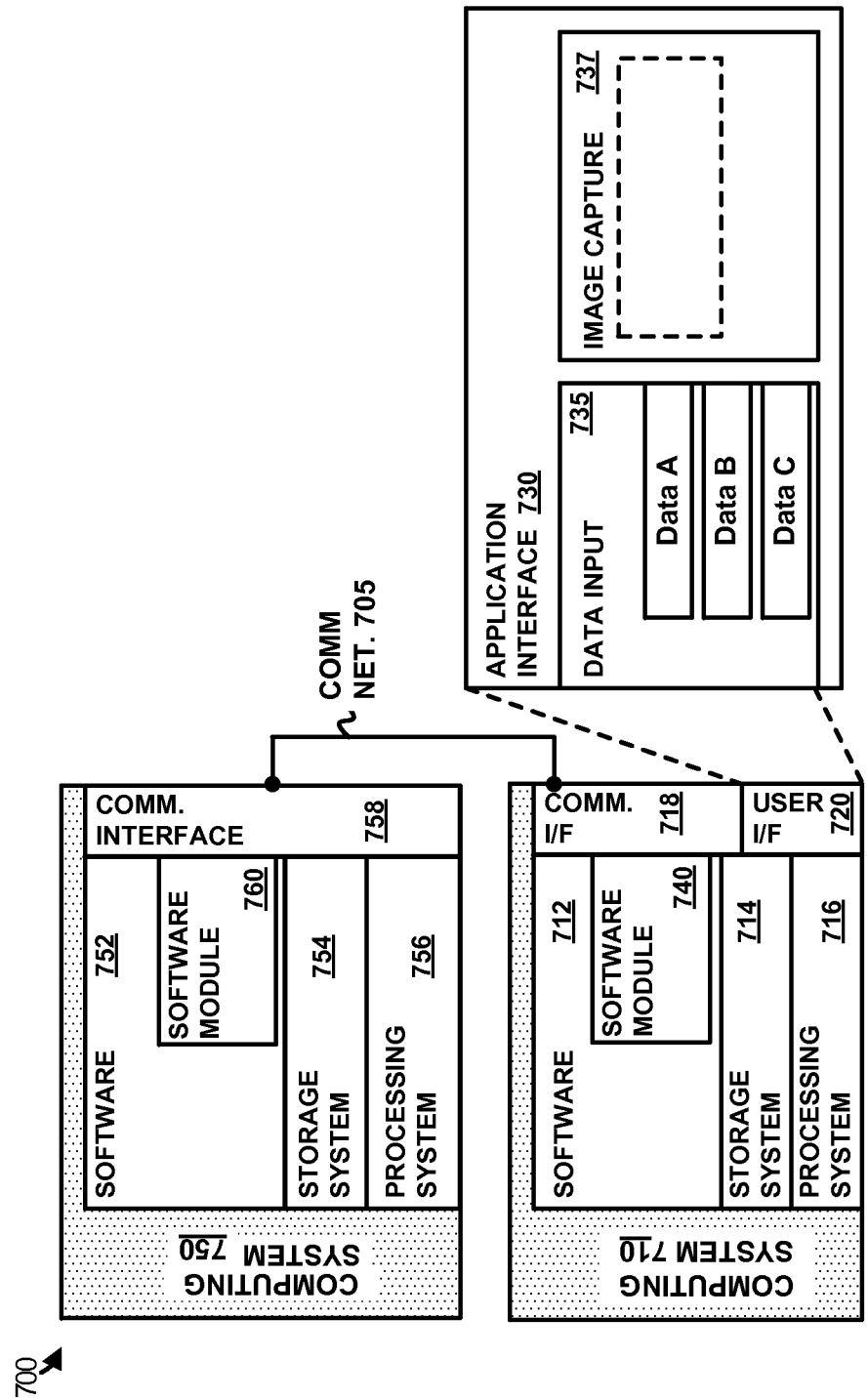
FIG. 7 illustrates a monitoring computing environment according to one example.

FIG. 7 illustrates a monitoring computing environment 700 according to one example. Computing environment 700 includes computing system 710 and computing system 750. Computing system 710, in the present example, corresponds to user device 120 and computing system 750 corresponds to central database 140. Computing system 710 can include any smart phone, tablet computer, laptop computer, or other mobile device capable of recording data about tagged oil distribution units or mechanical equipment. Computing system 750 can include any server computer, desktop computer, laptop computer, or other device capable of storing and managing the data collected by computing system 710 or other similar computing systems.

In FIG. 7, computing system 710 includes processing system 716, storage system 714, software 712, communication interface 718, and user interface 720. Processing system 716 loads and executes software 712 from storage system 714, including software module 740. When executed by computing system 710, software module 740 directs processing system 716 to receive data about a distribution unit or mechanical equipment. Such data could include any of the information described in the previous figures.

Although computing system 710 includes one software module in the present example, it should be understood that one or more modules could provide the same operation.

Additionally, computing system 710 includes communication interface 718 that can be configured to transmit the collected data to computing system 750 using communication network 705. Communication network 705 could include the Internet, cellular, satellite, or any other form of communication network. In some examples, communication interface 718 can further include a global positioning system to determine the location of computing system 710.

Referring still to FIG. 7, processing system 716 can comprise a microprocessor and other circuitry that retrieves and executes software 712 from storage system 714. Processing system 716 can be implemented within a single processing device but can also be distributed across multiple processing devices or sub-systems that cooperate in executing program instructions. Examples of processing system 716 include general purpose central processing units, application specific processors, and logic devices, as well as any other type of processing device, combinations of processing devices, or variations thereof.

Storage system 714 can comprise any storage media readable by processing system 716, and capable of storing software 712. Storage system 714 can include volatile and non-volatile, removable and non-removable media implemented in any method or technology for storage of information, such as computer readable instructions, data structures, program modules, or other data. Storage system 714 can be implemented as a single storage device but may also be implemented across multiple storage devices or sub-systems. Storage system 714 can comprise additional elements, such as a controller, capable of communicating with processing system 716.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

User interface 720 can include a mouse, a keyboard, a camera, a Barcode scanner, a voice input device, a touch input device for receiving a gesture from a user, a motion input device for detecting non-touch gestures and other motions by a user, and other comparable input devices and associated processing elements capable of receiving user input from a user. These input devices can be used for defining data about distribution units or equipment. Output devices such as a graphical display, speakers, printer, haptic devices, and other types of output devices may also be included in user interface 720. The aforementioned user input and output devices are well known in the art and need not be discussed at length here.

In some examples, computing system 710 can include an accelerometer to track the movement of the user around the tagged units, a GPS unit, a time and date module, among many others.

Application interface 730 can include data input 735 and image capture 737. In one example, data input 735 can be used to collect information regarding a distribution item such as the identifier of the distribution item, the seal tag identifiers, the amount of oil being transferred, or any other information about the distribution unit. In another example, data input 735 can be used to collect information about mechanical equipment such as oil level, tire pressure, or any other information about the equipment.

Further, application interface 730 could include image capture 737 that could be used to receive input such as QR Codes and Barcodes to identify items on the distributing units or the equipment.

It should be understood that although computing system 710 is shown as one system, the system can comprise one or more systems to collect data.

Computing system 750 includes processing system 756, storage system 754, software 752, and communication interface 758. Processing system 756 loads and executes software 752 from storage system 754, including software module 760. When executed by computing system 750, software module 760 directs processing system 710 to store and manage the data from computing system 710 and other similar computing systems.

Although computing system 710 includes one software module in the present example, it should be understood that one or more modules could provide the same or similar operation.

Additionally, computing system 750 includes communication interface 758 that can be configured to receive the data from computing system 710 using communication network 705.

Referring still to FIG. 7, processing system 756 can comprise a microprocessor and other circuitry that retrieves and executes software 752 from storage system 754. Processing system 756 can be implemented within a single processing device but can also be distributed across multiple processing devices or sub-systems that cooperate in executing program instructions. Examples of processing system 756 include general purpose central processing units, application specific processors, and logic devices, as well as any other type of processing device, combinations of processing devices, or variations thereof.

Storage system 754 can comprise any storage media readable by processing system 756, and capable of storing software 752 and data from computing system 710. Data from computing system 710 may be stored in a word, excel, or any other form of digital file. Storage system 754 can include volatile and nonvolatile, removable and non-removable media implemented in any method or technology for storage of information, such as computer readable instructions, data structures, program modules, or other data. Storage system 754 can be implemented as a single storage device but may also be implemented across multiple storage devices or subsystems. Storage system 754 can comprise additional elements, such as a controller, capable of communicating with processing system 756.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

In some examples, computing system 750 could include a user interface The user interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in the user interface. The aforementioned user input and output devices are well known in the art and need not be discussed at length here.

It should be understood that although computing system 750 is shown as one system, the system can comprise one or more systems to store and manage received data.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for monitoring equipment, comprising;
    initializing a recording application on a user device;
    recording information about a seal tag by the recording application, wherein the seal tag is associated with an oil or gas distribution unit or mechanical equipment associated with the distribution unit;
    recording other information associated with the distribution unit or mechanical equipment, the information comprising global positioning system information associated with the user device; and
    transmitting the recorded information by the user device via a network to a central database.

2. The method according to claim 1, further comprising recording information associated with the distribution unit.

3. The method according to claim 2, wherein a QR code or bar code comprises the information about a seal tag or the information associated with the distribution unit.

4. The method according to claim 3, wherein the recording of the information about a seal tag or the information associated with the distribution unit comprises taking a picture of the QR code or bar code.

5. The method according to claim 1, wherein the other information associated with the distribution unit or mechanical equipment further comprises an amount of fluid extracted.

6. The method according to claim 5, wherein the other information comprises a time and date from the user device.

7. The method according to claim 1, further comprising populating one or more fields in a dynamic report with the recorded information about the seal tag, or the recorded information associated with the distribution unit or mechanical equipment, and transmitting the dynamic report to a user or to the central database.

8. The method of claim 1, further comprising recording information associated with a new seal tag to be affixed to the distribution unit or mechanical equipment.

9. A system for monitoring equipment, comprising:
    a user device capable of recording information about a seal tag, wherein the seal tag is associated with a piece of equipment at a site, recording information associated with the site comprising global positioning information associated with the user device, recording information associated with a new seal tag to be affixed to the equipment, and transmitting the recorded information; and
    a central database capable of receiving and storing the recorded information via a network from the user device.

10. The system according to claim 9, wherein the user device is further capable of populating one or more fields in a dynamic report with the recorded information about the seal tag, or the recorded information associated with site, and transmitting the dynamic report to a user or to the central database.

11. The system according to claim 10, wherein the central database is further capable of storing the report.

12. The system according to claim 10, wherein the dynamic report comprises fields for the recorded information about the seal tag, or the recorded information associated with site, and the dynamic report is used at least in part for billing, invoicing, or information about a service call.

13. The system according to claim 9, wherein a QR code or bar code comprises the information about a seal tag or the information associated with the piece of equipment, where the piece of equipment comprises an oil or gas distribution unit.

14. The system according to claim 13, wherein the recording of the information about a seal tag or the information associated with the distribution unit comprises taking a picture of the QR code or bar code.

15. A computer readable medium having instructions stored thereon, which if executed by a processor, cause the processor to:
    record information about a seal tag, wherein the seal tag is associated with a equipment associated with a site;
    record information associated with the site comprising global positioning information associated with the user device; and
    transmit the recorded information about a seal tag or associated with the site via a network to a central database;
    wherein a QR code or bar code comprises the information about a seal tag or the information associated with the site.

16. The computer readable medium according to claim 15, having further instructions stored thereon, which if executed by a processor, cause the processor to record information associated with a new seal tag to be affixed to the equipment and transmit the recorded information associated with the new seal tag to the central database.

17. The computer readable medium according to claim 15, having further instructions stored thereon, which if executed by a processor, cause the processor to populate one or more fields in a dynamic report with the recorded information about the seal tag, or the recorded information associated with the site, and transmitting the dynamic report to a user or to the central database.

18. The computer readable medium of claim 17, wherein the dynamic report comprises fields for the recorded information about the seal tag, or the recorded information associated with site, and the dynamic report is used at least in part for billing, invoicing, or information about a service call.

19. The computer readable medium according to claim 15, having further instructions stored thereon, which if executed by a processor, cause the processor to record other information about the equipment, and transmit the recorded other information to the central database.

20. The computer readable medium of claim 19, wherein the equipment comprises equipment related to the oil and gas industry.

* * * * *